(12) United States Patent
Kim et al.

(10) Patent No.: US 9,261,882 B2
(45) Date of Patent: Feb. 16, 2016

(54) APPARATUS AND METHOD FOR SHARING VEHICLE INFORMATION

(71) Applicant: Electronics and Telecommunications Research Institute, Daejeon (KR)

(72) Inventors: Jung Sook Kim, Daejeon (KR); Ju Wan Kim, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/629,518

(22) Filed: Feb. 24, 2015

(65) Prior Publication Data

US 2015/0241880 A1    Aug. 27, 2015

(30) Foreign Application Priority Data

Feb. 26, 2014   (KR) .................. 10-2014-0022606

(51) Int. Cl.
| | |
|---|---|
| *G01C 22/00* | (2006.01) |
| *G05D 1/02* | (2006.01) |
| *G05D 1/00* | (2006.01) |
| *G08G 1/16* | (2006.01) |
| *B60W 50/00* | (2006.01) |

(52) U.S. Cl.
CPC ......... *G05D 1/0287* (2013.01); *B60W 50/0097* (2013.01); *G05D 1/0055* (2013.01); *G08G 1/163* (2013.01)

(58) Field of Classification Search
None
See application file for complete search history.

(56) References Cited

U.S. PATENT DOCUMENTS

| | | | |
|---|---|---|---|
| 8,160,764 B2 | 4/2012 | Choi et al. | |
| 2013/0151062 A1 | 6/2013 | Lee et al. | |
| 2013/0211656 A1 | 8/2013 | An et al. | |
| 2013/0222592 A1* | 8/2013 | Gieseke | G08G 1/04 348/148 |
| 2013/0300740 A1* | 11/2013 | Snyder | G06F 3/016 345/420 |
| 2013/0304326 A1* | 11/2013 | Van Dongen | B60W 30/12 701/42 |

* cited by examiner

*Primary Examiner* — Adam Alharbi
(74) *Attorney, Agent, or Firm* — Rabin & Berdo, P.C.

(57) ABSTRACT

Provided are an apparatus and method for sharing vehicle information among autonomous vehicles. According to the apparatus and method, not only current driving-related information and future driving-related information of a self vehicle but also current driving-related information and future driving-related information of another vehicle is acquired and used to control travel of the self vehicle. Accordingly, the safety of travel is improved, and efficient autonomous travel is enabled.

18 Claims, 5 Drawing Sheets

APPARATUS AND METHOD FOR SHARING VEHICLE INFORMATION

CROSS-REFERENCE TO RELATED APPLICATION

This application claims priority to and the benefit of Korean Patent Application No. 10-2014-0022606, filed on Feb. 26, 2014, the disclosure of which is incorporated herein by reference in its entirety.

BACKGROUND

1. Field of the Invention

The present invention relates to an apparatus and method for sharing information among vehicles, and more particularly, to an apparatus and method for sharing vehicle information, such as driving-related information and environmental information, among autonomous vehicles using wireless communication.

2. Discussion of Related Art

Current autonomous vehicle apparatuses independently collect and process sensing information and make decisions without cooperating with one another. Each autonomous vehicle can use only sensing information obtained from a sensor installed therein. Since the sensing range of each sensor is limited, it is not possible to acquire information from outside the range. Therefore, even when a dangerous vehicle or obstacle is in an area outside the sensing range of a sensor installed in a vehicle, it is not possible to recognize the presence in advance.

In addition, sensors mainly used in current autonomous vehicles are image sensors and laser scanners, which require lines of sight (LOSs) between sensing-target objects and them. In other words, even when a sensing-target object is within the sensing range of a vehicle sensor, it is not possible to sense the sensing-target object unless the LOS is ensured.

SUMMARY OF THE INVENTION

The present invention is directed to providing a vehicle information sharing apparatus and method for readily sharing information sensed by a plurality of autonomous vehicles and driving path information at a system level.

The present invention is also directed to providing a vehicle information sharing apparatus and method for enabling an autonomous vehicle to use sensing information of a place outside the sensing range of the vehicle by sharing driving-related information including environmental information and future driving-related information.

According to an aspect of the present invention, there is provided an apparatus for sharing vehicle information, the apparatus including: a self sensor processor configured to acquire driving-related information through a sensor of a self vehicle; a self future prediction sensor processor configured to generate future driving-related information of the self vehicle based on the driving-related information; a remote virtual sensor processor configured to receive driving-related information and future driving-related information of another vehicle; a dynamic map processor configured to collect the driving-related information of the vehicles including the self vehicle and generate dynamic map data; a cooperative sensor interface configured to analyze driving-related information requested by the dynamic map processor and request the driving-related information from at least one of the self sensor processor, the self future prediction sensor processor, and the remote virtual sensor processor; a static map processor configured to provide static map data including road information; and a path generator configured to generate a driving path of the self vehicle using the static map data provided by the static map processor and the dynamic map data generated by the dynamic map processor.

The cooperative sensor interface may check whether the driving-related information requested by the dynamic map processor is the driving-related information and the future driving-related information of the self vehicle or the driving-related information and the future driving-related information of the other vehicle, and request the driving-related information requested by the dynamic map processor from the corresponding sensor processor.

When the driving-related information requested by the dynamic map processor is not driving-related information acquirable by the self sensor processor or the self future prediction sensor processor, the cooperative sensor interface may request the driving-related information from the other vehicle present in an area in which it is possible to communicate with the self vehicle through the remote virtual sensor processor.

When the self vehicle enters a dangerous zone, the cooperative sensor interface may request the driving-related information from the other vehicle present within a predetermined distance from the self vehicle through the remote virtual sensor processor.

The self future prediction sensor processor may generate the future driving-related information of the self vehicle using the static map data provided by the static map processor and the driving-related information of the self vehicle or using the driving path generated by the path generator and the driving-related information of the self vehicle.

The path generator may check the future driving-related information of the self vehicle and the future driving-related information of the other vehicle, and adjust the driving path of the self vehicle dependent on the future driving-related information of the self vehicle not to overlap a driving path dependent on the future driving-related information of the other vehicle.

According to another aspect of the present invention, there is provided a method of sharing vehicle information, the method including: acquiring driving-related information through a sensor of a self vehicle; generating future driving-related information of the self vehicle based on the driving-related information of the self vehicle; receiving driving-related information and future driving-related information of another vehicle; and controlling travel of the self vehicle using the driving-related information of the vehicles including the self vehicle.

The receiving of the driving-related information and the future driving-related information of the other vehicle may include receiving, by the self vehicle, driving-related information received by a first vehicle present in an area in which it is possible to communicate with the self vehicle from a second vehicle present in another area in which it is impossible to communicate with the self vehicle and it is possible to communicate with the first vehicle, through the first vehicle.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will now be described more fully with reference to the accompanying drawings to clarify aspects, features, and advantages of the present invention. The invention may, however, be embodied in many different forms and should not be construed as being limited to the embodiments set forth herein. Rather, these embodiments are provided so that this disclosure will be through and complete, and will fully convey the concept of the invention to those of ordinary skill in the art. The present invention is defined by the appended claims.

Meanwhile, the terms used herein are for the purpose of describing particular exemplary embodiments only and are not intended to be limiting. As used herein, the singular forms "a," "an," and "the" are intended to include the plural forms as well, unless the context clearly indicates otherwise. It will be further understood that the terms "comprises" or "comprising," when used in this specification, do not preclude the presence or addition of one or more components, steps, operations, and/or elements other than a mentioned component, step, operation, and/or element. Hereinafter, the present invention will be described in detail with reference to the accompanying drawings.

Figure 1:
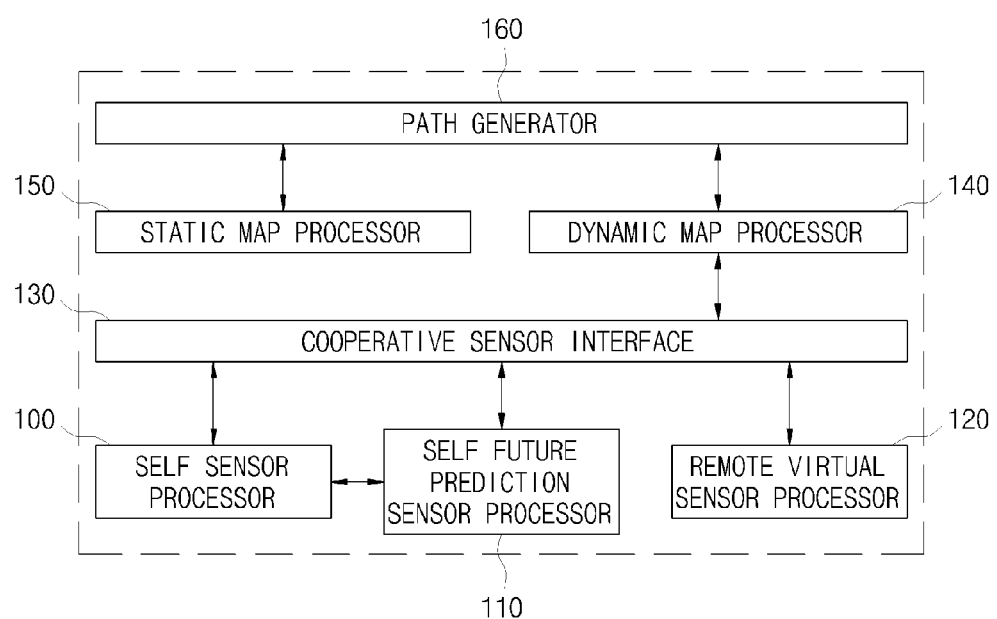
FIG. 1 is a block diagram of an apparatus for sharing vehicle information according to an exemplary embodiment of the present invention.

FIG. 1 shows a configuration of an apparatus for sharing vehicle information according to an exemplary embodiment of the present invention.

An apparatus for sharing vehicle information according to an exemplary embodiment of the present invention includes a self sensor processor 100, a self future prediction sensor processor 110, a remote virtual sensor processor 120, a cooperative sensor interface 130, a dynamic map processor 140, a static map processor 150, and a path generator 160.

The self sensor processor 100 processes sensing data collected by a sensor installed in an autonomous vehicle. In the autonomous vehicle, a plurality of laser scanners, image sensors, ultrasonic sensors, Differential Global Positioning System (DGPS) sensors, etc. are installed. The self sensor processor 100 processes sensing signals of the sensors installed in the autonomous vehicle and generates data that can be used by the dynamic map processor 140, such as a self vehicle speed, a self vehicle position, an obstacle position, an obstacle speed, an obstacle size, an obstacle attribute (e.g., static/dynamic or living/non-living).

The self future prediction sensor processor 110 generates future driving-related information of the self vehicle (e.g., time-specific position information, speed information, etc. of the self vehicle) based on driving-related information processed by the self sensor processor 100. Also, the self future prediction sensor processor 110 may predict future driving-related information of the self vehicle based on a future driving path of another autonomous vehicle. When the path generator 160 generates a driving path and a speed of the self vehicle, the self future prediction sensor processor 110 may generate future position information of the self vehicle, etc. based on the generated driving path, speed, and so on.

The remote virtual sensor processor 120 provides a virtual function of receiving vehicle and traffic situation information from a plurality of vehicles including a second autonomous vehicle, a third autonomous vehicle, etc. at a remote place through radio communication and operating as if the remote virtual sensor processor 120 were capable of remote sensing.

Therefore, the remote virtual sensor processor 120 receives vehicle speeds, vehicle positions, and times provided by the self sensor processors of the autonomous vehicles at the remote place, obstacle positions, obstacle speeds, obstacle sizes, obstacle attributes, and times sensed by the autonomous vehicles at the remote place, time-specific future position information and future speed information provided by the self future prediction sensor processors of the autonomous vehicles at the remote place, and provides the received information to the self vehicle.

The cooperative sensor interface 130 provides a unified interface for accessing the self sensor processor 100, the self future prediction sensor processor 110, and the remote virtual sensor processor 120.

When the superior dynamic map processor 140 requests specific sensing information, the cooperative sensor interface 130 analyzes the request to determine which one of 1) self vehicle and self vehicle environment information, 2) future information of the self vehicle, and 3) remote sensor information is the requested sensing information. Based on a determination result, the cooperative sensor interface 130 delivers the request of the dynamic map processor 140 to the corresponding sensor processor, thus assigning the corresponding sensor processor a task to be processed. When necessary, the cooperative sensor interface 130 also serves to assign tasks to a plurality of sensor processors and then combine task results.

The dynamic map processor 140 manages the position, the speed, and the travel direction of the self vehicle; the obstacle position, the obstacle speed, the obstacle size, and the obstacle attribute; the positions, the speeds, the sizes, and the attributes of the remote obstacles provided by the remote autonomous vehicles; and the position, speed, future position, and future speed information of the remote autonomous vehicles as map data objects.

The static map processor 150 stores and provides static road information objects to the self future prediction sensor processor 110, the path generator 160, and so on.

The path generator 160 generates a driving path of the self vehicle based on map data provided by the dynamic map processor 140 and the static map processor 150. At this time, the path generator 160 may compare future position information dependent on the driving path of the self vehicle with future position information dependent on information received from another vehicle, and adjust the driving path of the self vehicle so that paths of the two vehicles do not overlap.

FIGS. 2 to 5 are diagrams showing examples of sharing information among autonomous vehicles using apparatuses for sharing vehicle information according to an exemplary embodiment of the present invention.

Figure 2:
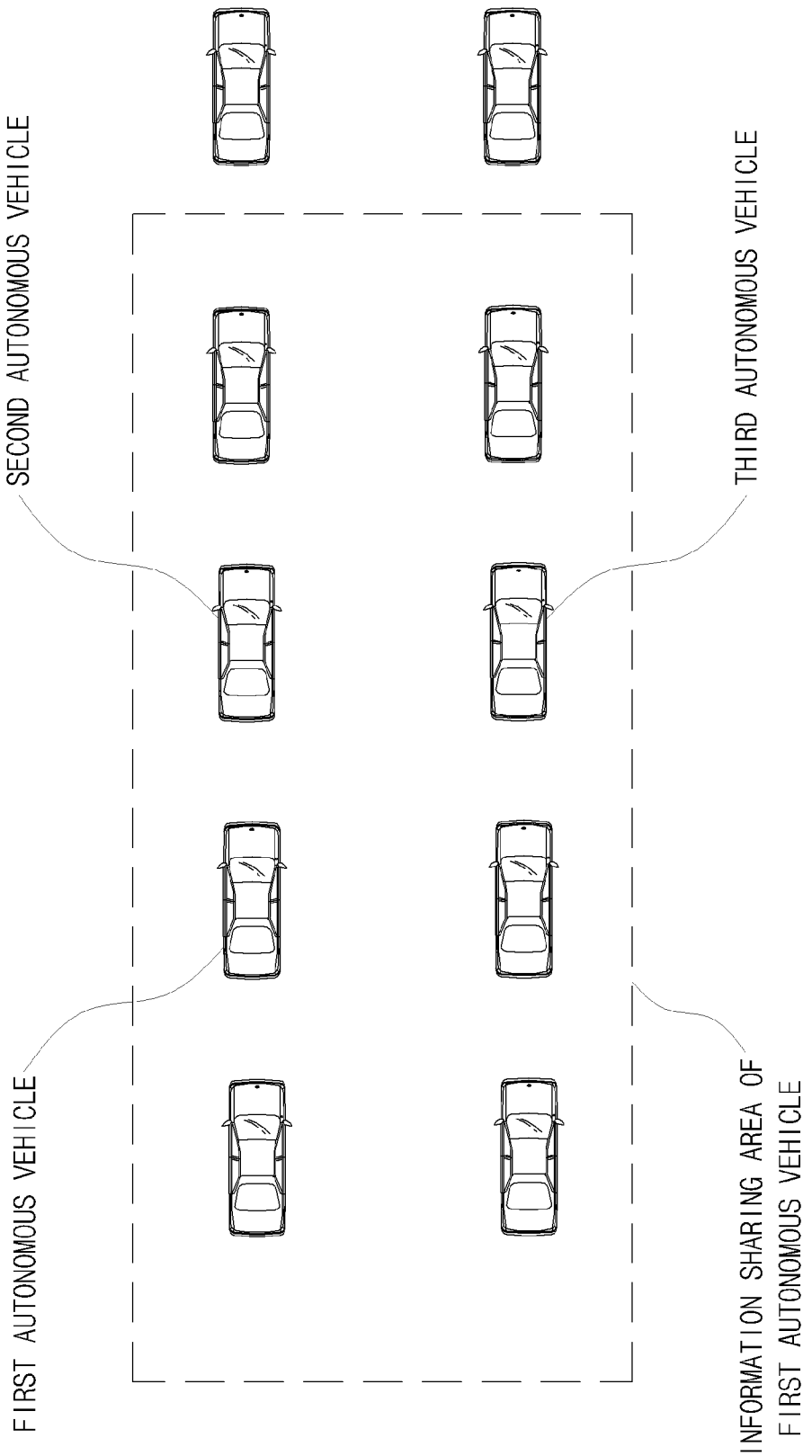
FIGS. 2 to 5 are diagrams showing examples of sharing vehicle information using apparatuses for sharing vehicle information according to an exemplary embodiment of the present invention.

FIG. 2 shows a basic mechanism for a first autonomous vehicle having a vehicle information sharing apparatus therein to collect and use information provided by other autonomous vehicles.

The first autonomous vehicle may collect and use vehicle information and surrounding environment information provided by the information sharing apparatuses of a second autonomous vehicle and a third autonomous vehicle while communicating with the second autonomous vehicle and the third autonomous vehicle in a first autonomous vehicle information sharing area.

The information sharing area is generally set by the first autonomous vehicle according to the communication range, the travel direction, the map information, etc. of the first autonomous vehicle.

Information is shared among autonomous vehicles in the form of 1) request-response or 2) broadcasting. Information sharing in the form of request-response is mainly used to share information that dynamically varies over time, and information sharing in the form of broadcasting is used to share static information independent of time.

Shared information includes 1) self vehicle information (e.g., a speed, a position, and a time), 2) surrounding information sensed by a self vehicle (e.g., an obstacle position, an obstacle speed, an obstacle size, and an obstacle attribute (static/dynamic)), and 3) future information of the self vehicle (e.g., time-specific future positions and speeds of the self vehicle).

Figure 3:
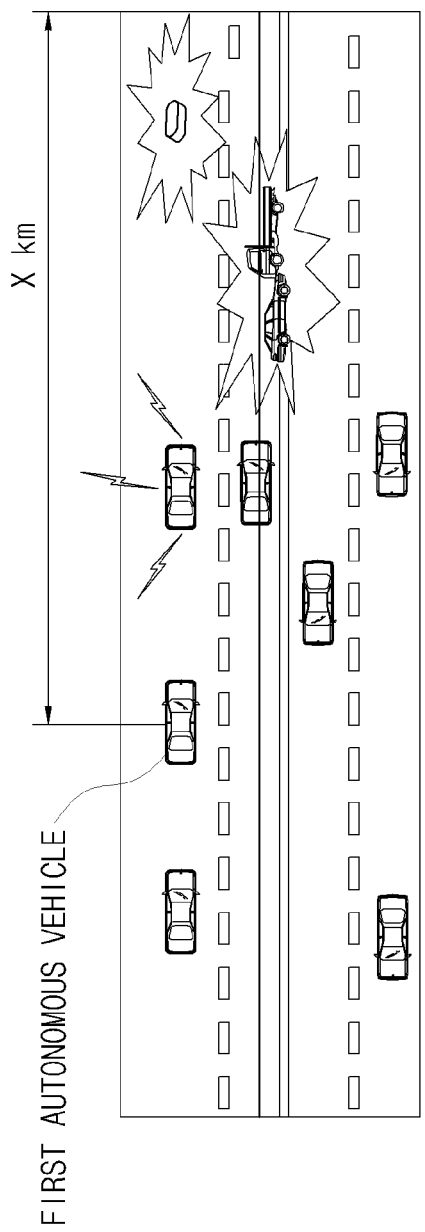
Figure 4:
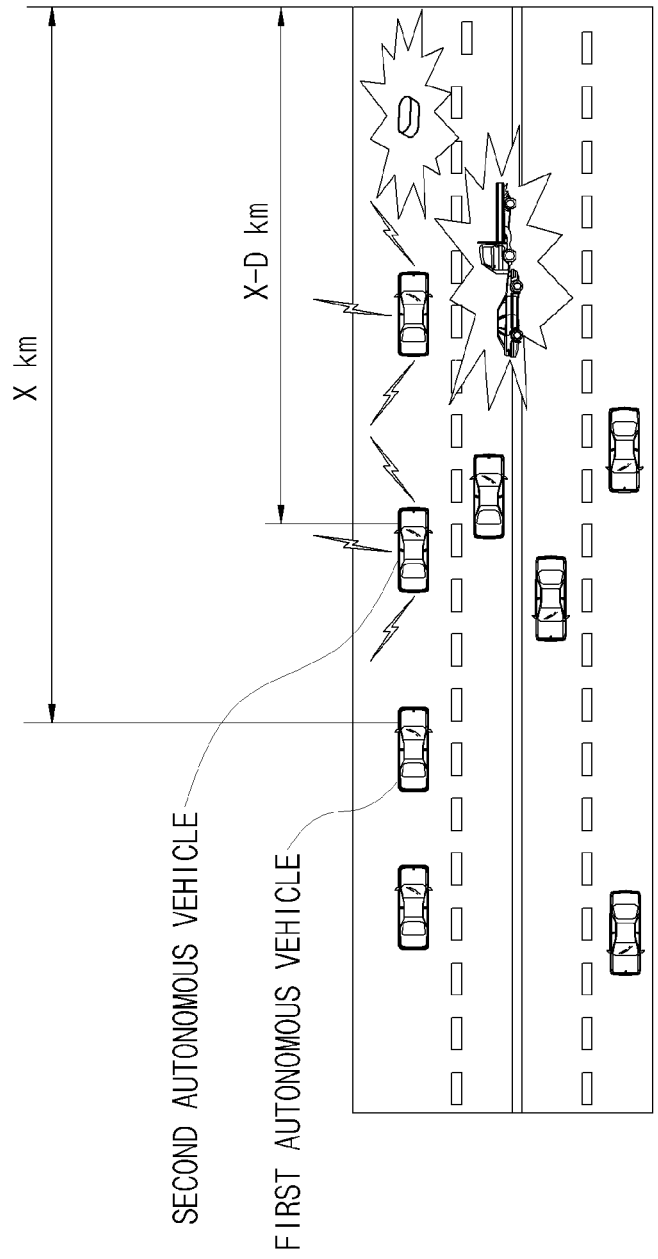

FIGS. 3 and 4 show examples of sharing information among autonomous vehicles using a vehicle information sharing apparatus.

FIG. 3 shows an example in which a first autonomous vehicle collects information on a stopped obstacle within X km in a travel direction.

The dynamic map processor of the first autonomous vehicle requests the information through the cooperative sensor interface. The cooperative sensor interface requests a self vehicle position from the self sensor processor, collects information on an obstacle within X km from stopped obstacle information collected by the remote virtual sensor processor based on the self vehicle position, and returns the collected obstacle information.

Since autonomous vehicles in which apparatuses for sharing information among autonomous vehicles are installed periodically broadcast information on stopped obstacles, the remote virtual sensor processor of the first autonomous vehicle receives obstacle information (e.g., an obstacle position, an obstacle size, an obstacle attribute, and a time) transmitted by the remote virtual sensor processors of other autonomous vehicles, and delivers the obstacle information to the dynamic map processor when it is determined that there is an obstacle in the stopped obstacle collection area of the first autonomous vehicle.

FIG. 4 shows an example in which a distance of X km in a travel direction for collecting information on a stopped obstacle requested by a first autonomous vehicle having a vehicle information sharing apparatus therein is larger than a communication distance of R km of the first autonomous vehicle.

The first autonomous vehicle selects a second autonomous vehicle that is closest to a target obstacle information collection area from among autonomous vehicles within the communication range of the first autonomous vehicle, and requests transmission of information on a stopped obstacle within (X-D) km. D is the distance between the first autonomous vehicle and the second autonomous vehicle. It is assumed that all communication devices have the same communication distance.

When (X-D)<R, the second autonomous vehicle transmits static obstacle information of an (X-D) area collected by its self sensor processor or remote virtual sensor processor to the remote virtual sensor processor of the first autonomous vehicle.

When (X-D)>R, the second autonomous vehicle repeats the process of selecting a third autonomous vehicle that is closest to the target obstacle information collection area from among autonomous vehicles within the communication range of the second autonomous vehicle, requesting transmission of information on a stopped obstacle within $(X-D-D_2)$ km, and collecting the stopped obstacle information. $D_2$ is the distance between the second autonomous vehicle and the third autonomous vehicle.

Figure 5:
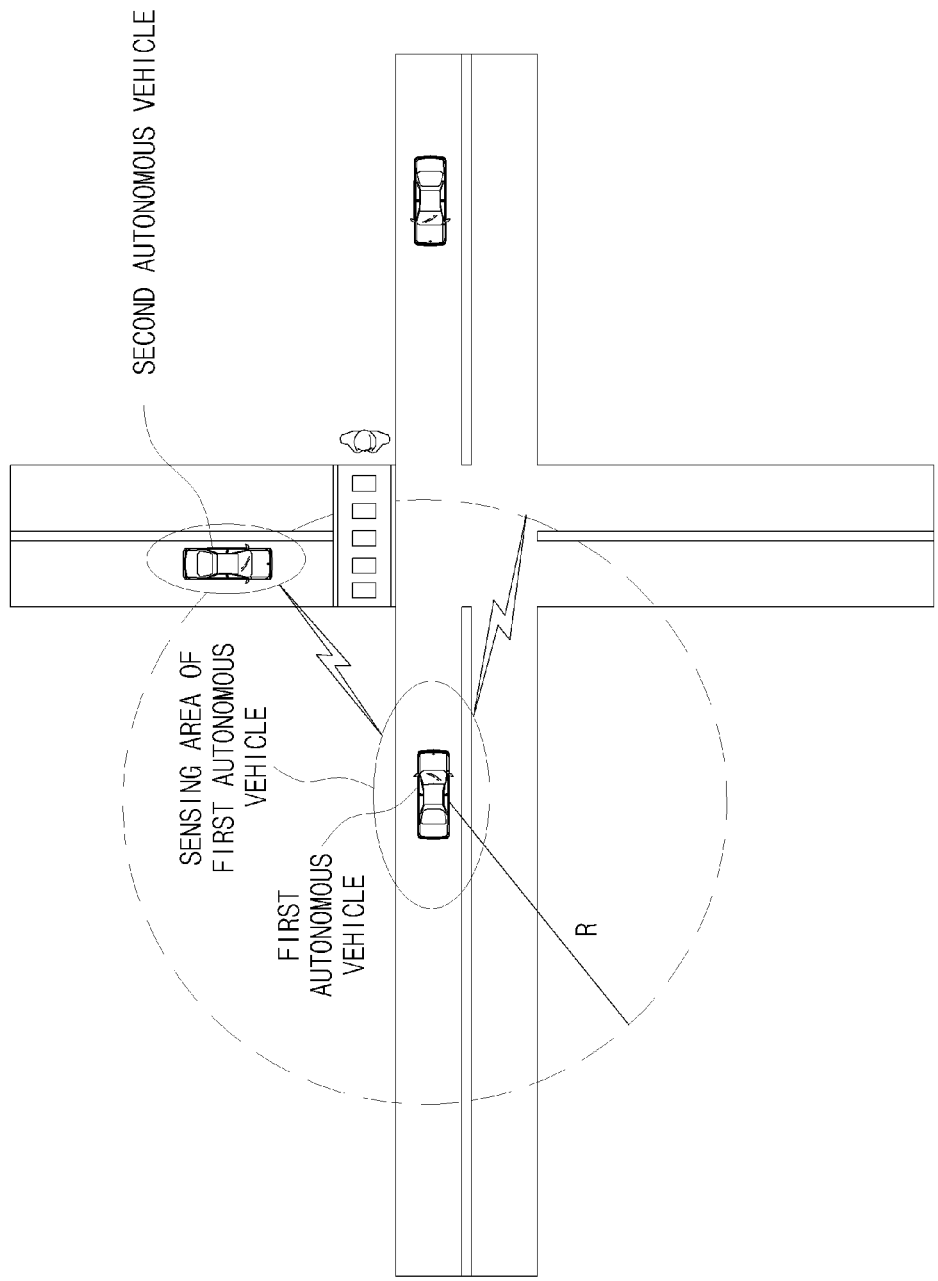

FIG. 5 shows an example in which an autonomous vehicle having a vehicle information sharing apparatus therein requests information from a surrounding vehicle when the autonomous vehicle enters a zone previously set as a dangerous zone (e.g., an intersection or a frequent accident zone).

A first autonomous vehicle entering an intersection, a frequent accident zone, etc. requests information on all objects within a predetermined distance for safe driving. In other words, the first autonomous vehicle requests information on all objects on a road within a radius R from its position.

The first autonomous vehicle requests remote sensor information from all autonomous vehicles within the radius R. Each of a second autonomous vehicle, a third autonomous vehicle, etc. receiving the request checks its position, and transmits self vehicle information (e.g., a time, the position, and a speed) and dynamic object information (e.g., an obstacle position, an obstacle size, an obstacle attribute, and a time) received from the self sensor processor to the first autonomous vehicle when the autonomous vehicle itself is within the radius R from the first autonomous vehicle. Even when there is no request of the first autonomous vehicle, information on a static object is periodically transmitted by the second autonomous vehicle and the third autonomous vehicle.

The first autonomous vehicle collects and uses the remote sensor information. According to an exemplary embodiment of the present invention, the current positions and current speed information of surrounding vehicles entering an intersection and obstacle information received from the surrounding vehicles can be applied to an intersection passage algorithm for safely passing through an intersection.

According to another exemplary embodiment of the present invention, it is also possible to use future information of the second autonomous vehicle upon entering an intersection.

A first autonomous vehicle requests remote sensor information from all autonomous vehicles within a radius R. Each of a second autonomous vehicle, a third autonomous vehicle, and a fourth autonomous vehicle receiving the request checks its position, and transmits self vehicle information (e.g., a time, the position, and a speed) and dynamic object information (e.g., an obstacle position, an obstacle size, an obstacle attribute, and a time) received from the self sensor processor to the first autonomous vehicle when the autonomous vehicle itself is within the radius R from the first autonomous vehicle. Even when there is no request of the first autonomous vehicle, information on a static object is periodically transmitted by the second autonomous vehicle, the third autonomous vehicle, and the fourth autonomous vehicle.

The first autonomous vehicle selects an autonomous vehicle whose driving path may overlap the driving path of the first autonomous vehicle from among the other autonomous vehicles. When the second autonomous vehicle is selected as the autonomous vehicle whose driving path may overlap that of the first autonomous vehicle, the first autonomous vehicle requests future information from the second autonomous vehicle. The second autonomous vehicle transmits time-specific future position and speed information thereon to the first autonomous vehicle through its self future prediction sensor processor. Using the time-specific future position and speed information, the first autonomous vehicle may generate a path so that its position does not overlap the position of the second autonomous vehicle at the same time point, and perform vehicle control.

An exemplary embodiment of the present invention provides a vehicle information sharing apparatus that improves the safety of travel of an autonomous vehicle by sharing vehicle information, sensing information of surroundings of autonomous vehicles, and future information of the vehicles among the vehicles through radio communication.

In addition, an autonomous vehicle that shares vehicle information according to an exemplary embodiment of the present invention provides an environment to which an advanced driving algorithm can be applied by acquiring a larger amount of information than an existing independent and uncooperative autonomous vehicle and negotiating with other vehicles.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An apparatus for sharing vehicle information, the apparatus comprising:
    a self sensor processor configured to acquire driving-related information through a sensor of a self vehicle;
    a self future prediction sensor processor configured to generate future driving-related information of the self vehicle based on the driving-related information;
    a remote virtual sensor processor configured to receive driving-related information and future driving-related information of another vehicle;
    a dynamic map processor configured to collect the driving-related information of the vehicles including the self vehicle and generate dynamic map data;
    a cooperative sensor interface configured to analyze driving-related information requested by the dynamic map processor and request the driving-related information from at least one of the self sensor processor, the self future prediction sensor processor, and the remote virtual sensor processor;
    a static map processor configured to provide static map data including road information; and
    a path generator configured to generate a driving path of the self vehicle using the static map data provided by the static map processor and the dynamic map data generated by the dynamic map processor.

2. The apparatus of claim 1, wherein the cooperative sensor interface checks whether the driving-related information requested by the dynamic map processor is the driving-related information and the future driving-related information of the self vehicle or the driving-related information and the future driving-related information of the other vehicle, and requests the driving-related information requested by the dynamic map processor from the corresponding sensor processor.

3. The apparatus of claim 1, wherein the cooperative sensor interface checks whether or not the driving-related information requested by the dynamic map processor is acquirable by the self sensor processor, and requests the driving-related information.

4. The apparatus of claim 1, wherein, when the driving-related information requested by the dynamic map processor is not acquirable by the self sensor processor or the self future prediction sensor processor, the cooperative sensor interface requests the driving-related information from the other vehicle present in an area in which it is possible to communicate with the self vehicle through the remote virtual sensor processor.

5. The apparatus of claim 1, wherein, when the self vehicle enters a dangerous zone, the cooperative sensor interface requests the driving-related information from the other vehicle present within a predetermined distance from the self vehicle through the remote virtual sensor processor.

6. The apparatus of claim 1, wherein the self sensor processor generates the driving-related information including information on the self vehicle and an obstacle around the self vehicle by processing sensing data collected by the sensor of the self vehicle.

7. The apparatus of claim 1, wherein the self future prediction sensor processor generates the future driving-related information including time-specific position information and speed information of the self vehicle based on the driving-related information of the self vehicle.

8. The apparatus of claim 1, wherein the remote virtual sensor processor receives information on a static object in the driving-related information of the other vehicle at regular intervals of time.

9. The apparatus of claim 1, wherein the self future prediction sensor processor generates the future driving-related information of the self vehicle using the static map data provided by the static map processor and the driving-related information of the self vehicle.

10. The apparatus of claim 1, wherein the self future prediction sensor processor generates the future driving-related information of the self vehicle using the driving path generated by the path generator and the driving-related information of the self vehicle.

11. The apparatus of claim 1, wherein the path generator checks the future driving-related information of the self vehicle and the future driving-related information of the other vehicle, and adjusts the driving path of the self vehicle dependent on the future driving-related information of the self vehicle not to overlap a driving path dependent on the future driving-related information of the other vehicle.

12. A method of sharing vehicle information, the method comprising:
    acquiring driving-related information through a sensor of a self vehicle;
    generating future driving-related information of the self vehicle based on the driving-related information of the self vehicle;
    receiving driving-related information and future driving-related information of another vehicle, including,
        when the self vehicle enters a dangerous zone, receiving the driving-related information and the future driving-related information from the another vehicle present within a predetermined distance from the self vehicle; and
    controlling travel of the self vehicle using the driving-related information of the vehicles including the self vehicle.

13. The method of claim 12, wherein the receiving of the driving-related information and the future driving-related information of the other vehicle includes, when the self vehicle cannot acquire or generate driving-related information required for the self vehicle through the sensor, requesting the driving-related information from the other vehicle present in an area in which it is possible to communicate with the self vehicle.

14. A method of sharing vehicle information, the method comprising:
- acquiring driving-related information through a sensor of a self vehicle;
- generating future driving-related information of the self vehicle based on the driving-related information of the self vehicle;
- receiving driving-related information and future driving-related information of another vehicle; and
- controlling travel of the self vehicle using the driving-related information of the vehicles including the self vehicle,
- wherein the receiving of the driving-related information and the future driving-related information of the other vehicle includes receiving, by the self vehicle, driving-related information received by a first vehicle present in an area in which it is possible to communicate with the self vehicle from a second vehicle present in another area in which it is impossible to communicate with the self vehicle and it is possible to communicate with the first vehicle, through the first vehicle.

15. The method of claim 12, wherein the generating of the future driving-related information of the self vehicle includes generating the future driving-related information of the self vehicle using the driving-related information of the self vehicle and static map data.

16. The method of claim 12, wherein the generating of the future driving-related information of the self vehicle includes generating a driving path of the self vehicle using dynamic map data generated based on the driving-related information of the vehicles including the self vehicle.

17. The method of claim 12, wherein the acquiring of the driving-related information through the sensor of the self vehicle includes generating the driving-related information including information on the self vehicle and an obstacle around the self vehicle using sensing data collected by the sensor of the self vehicle.

18. The method of claim 12, wherein the controlling of the travel of the self vehicle includes controlling the travel of the self vehicle so that a driving path dependent on the future driving-related information of the self vehicle does not overlap a driving path dependent on the future driving-related information of the other vehicle.

* * * * *